United States Patent
Yanagisawa

(10) Patent No.: US 11,116,152 B2
(45) Date of Patent: Sep. 14, 2021

(54) EMITTER AND DRIP IRRIGATION TUBE

(71) Applicant: Enplas Corporation, Saitama (JP)

(72) Inventor: Kazuma Yanagisawa, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 67 days.

(21) Appl. No.: 16/463,045

(22) PCT Filed: Nov. 2, 2017

(86) PCT No.: PCT/JP2017/039652
§ 371 (c)(1),
(2) Date: May 22, 2019

(87) PCT Pub. No.: WO2018/096900
PCT Pub. Date: May 31, 2018

(65) Prior Publication Data
US 2019/0274264 A1    Sep. 12, 2019

(30) Foreign Application Priority Data

Nov. 22, 2016 (JP) .............................. JP2016-227011

(51) Int. Cl.
*A01G 25/02* (2006.01)
*A01G 25/16* (2006.01)
*B05B 1/30* (2006.01)
*B05B 1/20* (2006.01)

(52) U.S. Cl.
CPC .......... *A01G 25/023* (2013.01); *A01G 25/02* (2013.01); *A01G 25/16* (2013.01); *B05B 1/3006* (2013.01); *B05B 1/202* (2013.01); *Y02A 40/22* (2018.01)

(58) Field of Classification Search
CPC ...... A01G 25/023; A01G 25/02; A01G 25/16; B05B 1/3006; B05B 1/202; Y02A 40/22
USPC .................................................. 239/542, 547
See application file for complete search history.

(56) References Cited

U.S. PATENT DOCUMENTS

| | | | |
|---|---|---|---|
| 5,052,625 A | 10/1991 | Ruskin | |
| 5,636,797 A * | 6/1997 | Cohen | .................. A01G 25/023 239/542 |
| 6,015,102 A * | 1/2000 | Daigle | ................. A01G 25/023 239/542 |

(Continued)

FOREIGN PATENT DOCUMENTS

| | | |
|---|---|---|
| GN | 105828599 A | 8/2016 |
| JP | 51-107644 A | 9/1976 |

(Continued)

OTHER PUBLICATIONS

Extended European Search Report dated Jun. 17, 2020 from EP Application No. 17874686.3, 7 pages (Continued)

*Primary Examiner* — Steven J Ganey
(74) *Attorney, Agent, or Firm* — Brundidge & Stanger, P.C.

(57) ABSTRACT

This emitter comprises: an emitter body having a groove, a recess and a through hole on the upper surface thereof; and a film joined to the upper surface. This drip irrigation tube comprises: a tube; a discharge opening that is a hole extending through a wall of the tube; and an emitter joined to an inner wall surface of the tube at a position of the inner wall surface corresponding to the discharge opening.

7 Claims, 7 Drawing Sheets

(56) References Cited

U.S. PATENT DOCUMENTS

| | | | |
|---|---|---|---|
| 2010/0282873 A1* | 11/2010 | Mattlin | A01G 25/023 239/542 |
| 2016/0278311 A1 | 9/2016 | Kidachi | |
| 2016/0309669 A1 | 10/2016 | Masahiro | |

FOREIGN PATENT DOCUMENTS

| | | |
|---|---|---|
| JP | 04-211311 A | 8/1992 |
| WO | 2009/104183 A1 | 8/2009 |
| WO | 2009/104183 A9 | 8/2009 |
| WO | 2015/080126 A1 | 6/2015 |

OTHER PUBLICATIONS

International Search Report from International Application No. PCT/JP2017/039652 dated Jan. 30, 2018.

* cited by examiner

EMITTER AND DRIP IRRIGATION TUBE

TECHNICAL FIELD

The present invention relates to an emitter, and a drip irrigation tube including the emitter.

BACKGROUND ART

Conventionally, a drip irrigation method is known as a method for culturing plants. In the drip irrigation method, a drip irrigation tube is disposed on a cultivation bed such as soil where plants are planted, and irrigation liquid such as water and liquid fertilizer is dropped to the cultivation bed from the drip irrigation tube. The drip irrigation method has been increasingly attracting attention in recent years since the method can minimize the consumption rate of the irrigation liquid.

Normally, the drip irrigation tube includes a tube provided with a plurality of through holes for discharging irrigation liquid, and a plurality of emitters (also called "drippers") for discharging irrigation liquid from respective through holes. Emitters that are joined on the inner wall surface of a tube, and emitters that are pierced into a tube from the external side of the tube are known.

As an example of the former emitter, a known emitter includes an inflow part configured to allow inflow of external liquid; a pressure reducing channel part connected with the inflow part and configured to distribute liquid having flown into the inflow part while reducing the pressure of the liquid; a flow rate control part connected with the pressure reducing channel part and configured to control a flow rate of liquid whose pressure has been reduced by the pressure reducing channel part; and a housing part connected with the flow rate control part and configured to house the liquid whose flow rate has been controlled by the flow rate control part, in which an emitter main body and a film having flexibility joined on the top surface of the emitter main body. In this emitter, the film moves toward and/or away from the liquid channel of the emitter in accordance with the liquid pressure in the tube so as to control the flow rate of liquid to be discharged from the emitter (see, for example, PTL 1).

CITATION LIST

Patent Literature

PTL 1
WO2015/080126

SUMMARY OF INVENTION

Technical Problem

Normally, it is preferable to reduce the size of the emitter from the viewpoint of preventing pressure drop of the liquid in the tube. In view of this, to effectively utilize the limited space of an emitter, the channels are disposed not only in the top surface of the emitter main body, but also in the lower surface of emitter main body, to which the tube is joined. As a result, the configuration of the metal mold for resin molding of the emitter may be complicated, and accordingly the manufacturing cost may be increased.

In addition, the above-mentioned emitter is typically joined to the inner wall of the tube by fusing, and when the emitter main body is joined to the tube with a sufficient strength, the tube may intrude into the groove and/or the recess in the lower surface of the emitter main body, and the depth of the groove and/or the recess may become smaller than a desired value in part or in whole. Consequently, the depth of the groove and/or recess may vary among emitters, and accordingly the flow rate may vary among emitters disposed in the tube.

That is, the above-mentioned emitter has a room for improvement in reduction of the manufacturing cost for the emitter, and in suppression of variation in flow rate among emitters.

An object of the present invention is to provide an emitter and a drip irrigation tube that can be manufactured at low cost and can suppress variation in flow rate among emitters.

Solution to Problem

The present invention provides an emitter including: an inflow part configured to allow inflow of external liquid; a pressure reducing channel part connected with the inflow part and configured to distribute the liquid having flown into the inflow part while reducing a pressure of the liquid; a flow rate control part connected with the pressure reducing channel part and configured to control a flow rate of the liquid whose pressure has been reduced by the pressure reducing channel part; and a housing part connected with the flow rate control part and configured to house the liquid whose flow rate has been controlled by the flow rate control part. The emitter is configured by an emitter main body and a film joined on the emitter main body, the film having flexibility. The emitter main body includes a first recess opening at at least a top surface of the emitter main body, a pressure reducing groove opening at the top surface of the emitter main body and having a zigzag planar shape, the pressure reducing groove being connected with the first recess, a second recess opening at the top surface of the emitter main body, the second recess being connected with the pressure reducing groove, a through hole opening at the second recess and a lower surface of the emitter main body, and a communication groove configured to communicate between the through hole and a peripheral portion of the second recess. The film is joined on the top surface of the emitter main body, and at least a part of the first recess opens to outside.

Further the present invention provides a drip irrigation tube including: a tube including a discharging port extending through a pipe wall of the drip irrigation tube; and the above-mentioned emitter joined on an inner wall surface of the tube at a position corresponding to the discharging port.

Advantageous Effects of Invention

According to the present invention, it is possible to provide an emitter and a drip irrigation tube that can be manufactured at low cost and can suppress variation in flow rate among emitters.

DESCRIPTION OF EMBODIMENTS

Figure 1A:
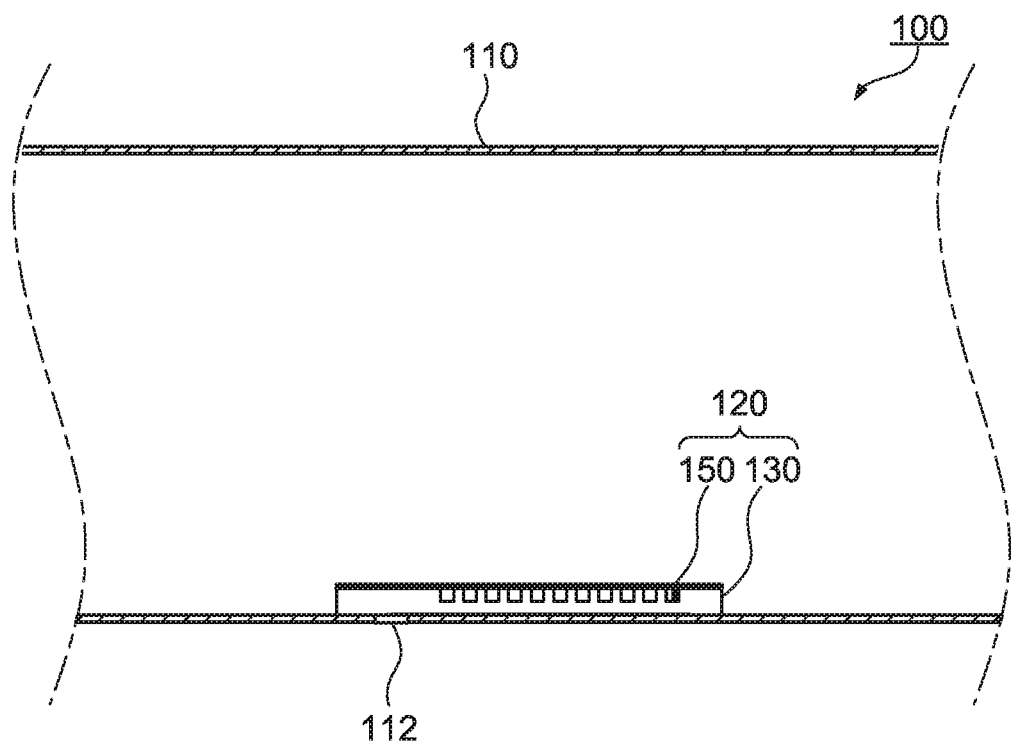
FIG. 1A is a sectional view along an axial direction of a drip irrigation tube according to an embodiment of the present invention.

An emitter of an embodiment of the present invention includes an inflow part configured to allow inflow of external liquid; a pressure reducing channel part connected with the inflow part and configured to distribute liquid having flown into the inflow part while reducing the pressure of the liquid; a flow rate control part connected with the pressure reducing channel part and configured to control a flow rate of liquid whose pressure has been reduced by the pressure reducing channel part; and a housing part connected with the flow rate control part and configured to house the liquid whose flow rate has been controlled by the flow rate control part, the emitter being composed of an emitter main body and a film joined to the emitter main body, the film having flexibility.

The emitter main body includes a recess that opens upward or opens at at least the top surface of the emitter main body, and the recess configures at least the inflow part, the pressure reducing channel part and the flow rate control part when the film is joined on the top surface of the emitter main body. For example, the emitter main body includes a first recess opening at at least a top surface of the emitter main body, a pressure reducing groove opening at the top surface of the emitter main body and has a zigzag planar shape, the pressure reducing groove being connected with the first recess, a second recess opening at the top surface of the emitter main body, the second recess being connected with the pressure reducing groove, a through hole opening at the second recess and a lower surface of emitter main body, and a communication groove configured to communicate between the through hole and a peripheral portion of the second recess. The film is joined on the top surface of the emitter main body, and at least a part of the first recess opens to the outside.

The top surface of the emitter main body is a portion that is visually recognized in a top plan view of the emitter main body, and the lower surface of the emitter main body is a portion that is visually recognized in a bottom plan view of the emitter main body. In addition, the side surface of the emitter main body is a portion between the top surface and the lower surface in a side view of the emitter main body.

Although the emitter main body may include only the top surface and the lower surface, it is preferable to employ a configuration in which the side surface is further provided such that and the first recess opens at the top surface and the side surface, and the film is joined on the entirety of the top surface from the viewpoint of suppressing intrusion of floating matters in the liquid into the inflow part and from the viewpoint of increasing the ease (productivity) of the manufacture of the emitter.

Although the lower surface of the emitter main body may be flat, it is preferable that the lower surface is curved to protrude downward in a direction crossing the extending direction of the pressure reducing groove from the viewpoint of increasing the joining strength of the emitter to the tube.

In addition, the arrangement and number of the channels in the emitter main body may be appropriately set as long as the effect of the present embodiment is ensured. For example, the number of the first recess in the emitter main body is not limited. Further, the number of the pressure reducing groove in the emitter main body is not limited. Further, the number of the portion that serves as the flow rate control part in the emitter main body, namely, the set of the second recess, the through hole and the communication groove is not limited.

In addition, as long as the effect of the emitter main body of the present embodiment is ensured, another configuration may be further included. Such a configuration may be, for example, a recess that is formed in the lower surface of the emitter main body such that the through hole opens at its bottom surface, and a ridge that is disposed on the bottom surface of the recess such that liquid can be distributed between the opening of the through hole and the portion corresponding to the discharging port in the recess.

The above-mentioned recess is preferable from the viewpoint of easily forming the discharging port at an appropriate position when forming the discharging port of the tube after the emitter is joined on the tube, and from the viewpoint of suppressing intrusion of foreign matters from the discharging port into the through hole. In addition, the height, number and planar shape of the ridge may be appropriately set as long as liquid can flow from the through hole to the discharging port. The ridge is preferable from the viewpoint of suppressing intrusion of foreign matters from the discharging port into the through hole.

The emitter main body is manufactured by shaping with a thermoplastic resin. Examples of the thermoplastic resin include polyethylene such as linear low density polyethylene and high density polyethylene, polypropylene, silicone, and industrial materials having rubber elasticity, and the examples of the industrial materials having the rubber elasticity include elastomer and rubber.

Normally, the film is made of a thermoplastic resin, and examples of the thermoplastic resin include the above-mentioned examples. The thickness of the film may be appropriately set as long as the flexibility of the film allows the film to make contact with, and to be separated from, the opening of the through hole in the second recess of the flow rate control part under the liquid pressure in the tube in the state where the film is joined on the top surface of the emitter main body.

Although the film may be prepared separately from the emitter main body, the film may be formed integrally with the emitter main body such that the film can be joined onto the top surface of the emitter main body. For example, the film is connected with the side edge of the top surface of the emitter main body with a hinge part therebetween.

The drip irrigation tube of the embodiments of the present invention includes a tube including a discharging port extending through a pipe wall of the drip irrigation tube, and the emitter joined at a position corresponding to the discharging port in an inner wall surface of the tube. Number of emitters per tube may be appropriately set as long as liquid can be appropriately discharged from discharging ports.

Also, the tube is normally made of a thermoplastic resin, and examples of the thermoplastic resin include the above-mentioned examples for the emitter main body. The drip irrigation tube may be manufactured by a publicly known manufacturing method for drip irrigation tubes as long as the emitter provided in the tube is the emitter according to an embodiment of the present invention.

Although the material resin of the emitter main body, the film and the tube may be identical to each other or different from each other, it is preferable that they be identical to each other from the view point of reducing environmental impact since the drip irrigation tube after the use can be suitably reused as the material of the emitter main body, the film and/or the tube.

The drip irrigation tube is favorable for drip irrigation. Liquid carried and supplied in the drip irrigation tube may be appropriately set as long as the liquid can be used in the drip irrigation, and examples of such liquid include water, liquid fertilizer, agricultural chemicals, and mixtures thereof. Embodiments of the present invention are described below in more detail.

Figure 1B:
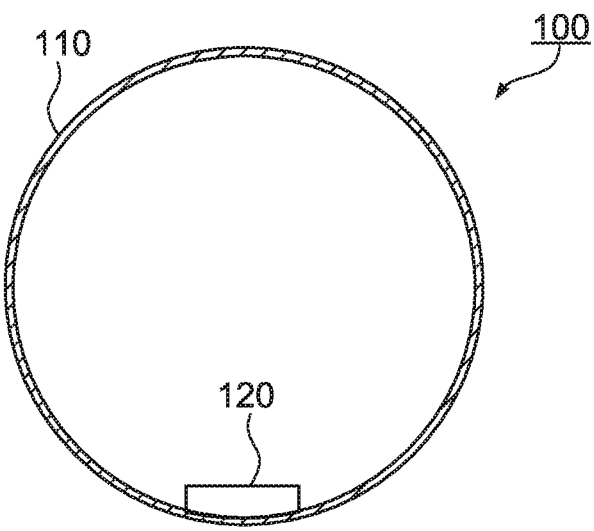
FIG. 1B is a sectional view perpendicular to the axial direction of the drip irrigation tube.

FIG. 1A is a sectional view along the axial direction of a drip irrigation tube according to an embodiment of the present invention, and FIG. 1B is a sectional view perpendicular to the axial direction of the drip irrigation tube. Drip irrigation tube 100 includes tube 110 including discharging port 112 extending through a pipe wall of the drip irrigation tube, and emitter 120 joined on an inner wall surface of tube 110 at a position corresponding to discharging port 112. Although not shown in the drawing, a plurality of emitters 120 are disposed on tube 110, and a plurality of discharging ports 112 corresponding to emitters 120 are formed in tube 110.

Tube 110 is a pipe for carrying irrigation liquid. Tube 110 is a flexible round pipe made of thermoplastic resin, for example. The thickness of the pipe wall of tube 110 is 1.0 mm, for example. Discharging ports 112 are formed at a predetermined interval (e.g. 200 to 500 mm) in the axis direction of tube 110. The diameter of the opening of discharging port 112 is, for example, about 1.0 mm, and may be set to any value as long as liquid can be discharged at a flow rate suitable for the use of irrigation.

Emitter 120 is joined on the inner wall surface of tube 110 by a publicly known method. Examples of the joining method include bonding with an adhesive agent, and welding and/or fusing of the resin material of emitter 120 or tube 110. Normally, discharging port 112 is formed after tube 110 and emitter 120 are joined to each other; however, discharging port 112 may be formed before tube 110 and emitter 120 are joined to each other.

Figure 2A:
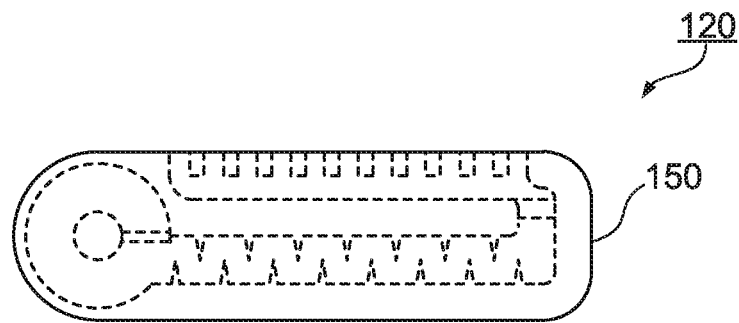
FIG. 2A is a plan view of an emitter according to the embodiment of the present invention.
Figure 2B:
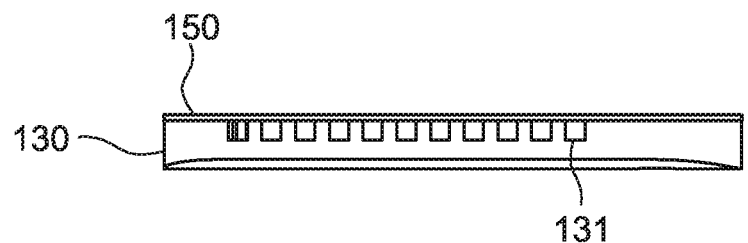
FIG. 2B is a back view of the emitter.
Figure 2C:
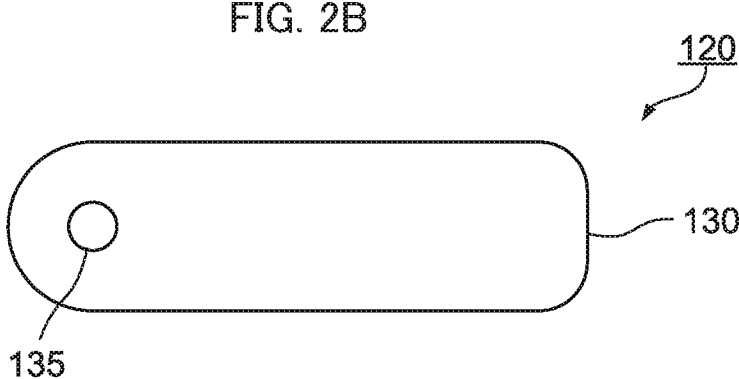
FIG. 2C is a bottom view of the emitter.
Figure 2D:
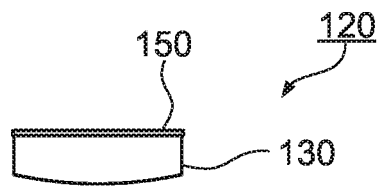
FIG. 2D is a side view of the emitter.

FIG. 2A is a plan view of emitter 120, FIG. 2B is a back view of emitter 120, FIG. 2C is a bottom view of emitter 120, and FIG. 2D is a side view of emitter 120. The size and shape of emitter 120 may be appropriately set as long as a desired function can be ensured.

Emitter 120 includes emitter main body 130 and film 150 joined on the top surface of emitter main body 130. Film 150 is a film having flexibility made of a thermoplastic resin, and is composed of a polyethylene film having a thickness of 500 μm, for example. Film 150 is joined on emitter main body 130 by fusing over the entire top surface of emitter main body 130, for example.

Figure 3A:
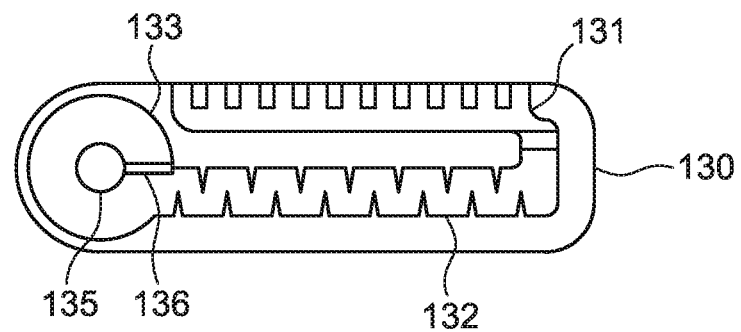
FIG. 3A is a plan view of an emitter main body of a first embodiment of the present invention.
Figure 3B:
FIG. 3B is a front view of the emitter main body.
Figure 3C:
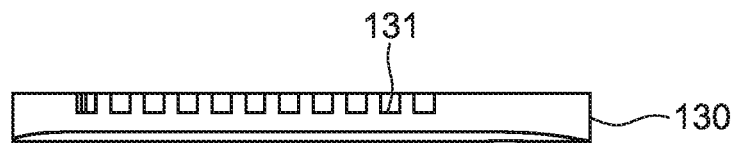
FIG. 3C is a back view of the emitter main body.
Figure 3D:
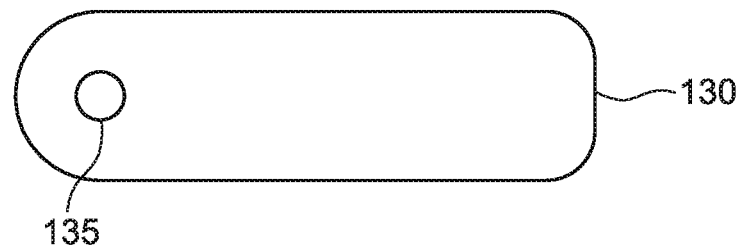
FIG. 3D is a bottom view of the emitter main body.
Figure 3E:
FIG. 3E is a side view of the emitter main body.
Figure 4A:
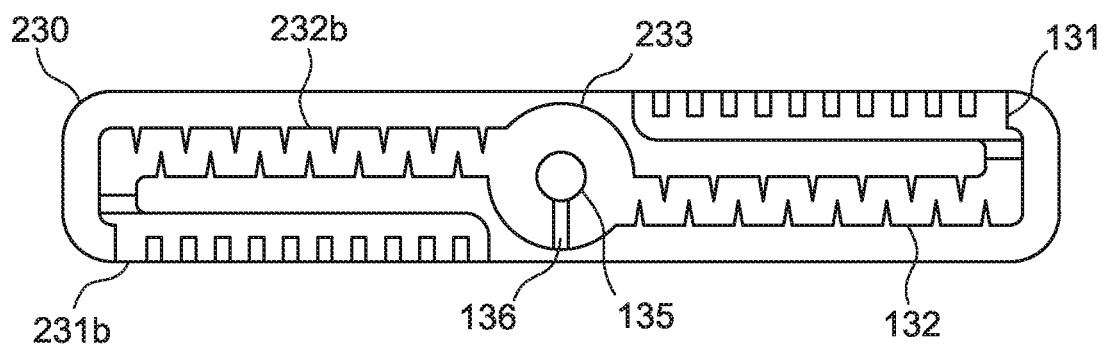
FIG. 4A is a plan view of an emitter main body of a second embodiment of the present invention.
Figure 4B:
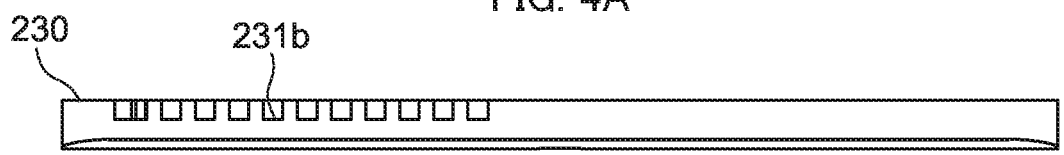
FIG. 4B is a front view of the emitter main body.
Figure 4C:
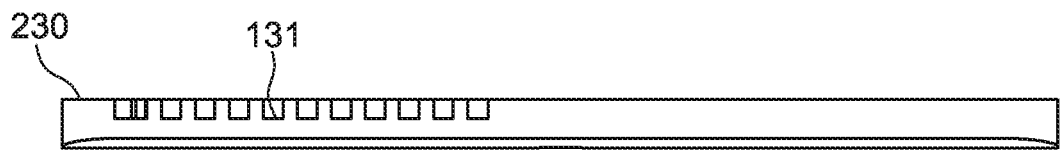
FIG. 4C is a back view of the emitter main body.
Figure 4D:
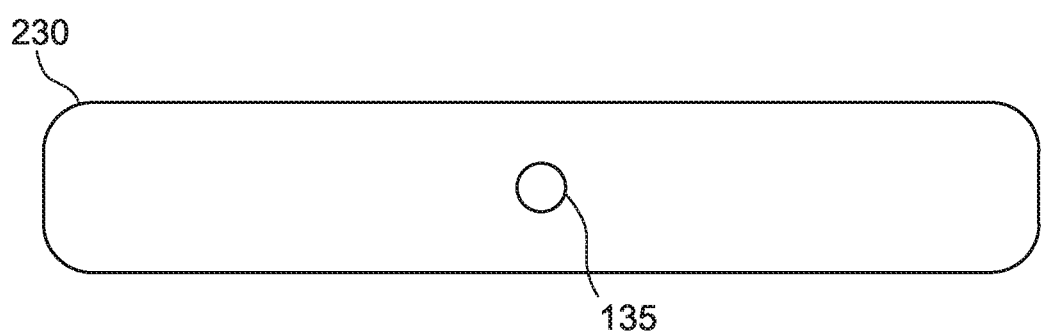
FIG. 4D is a bottom view of the emitter main body.
Figure 4E:
FIG. 4E is a side view of the emitter main body.
Figure 5A:
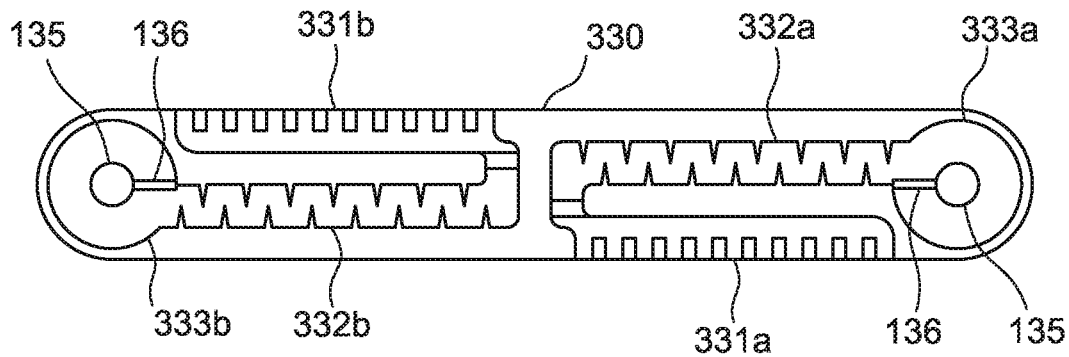
FIG. 5A is a plan view of an emitter main body of a third embodiment of the present invention.
Figure 5B:
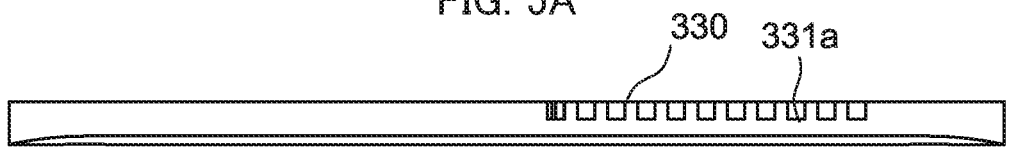
FIG. 5B is a front view of the emitter main body.
Figure 5C:
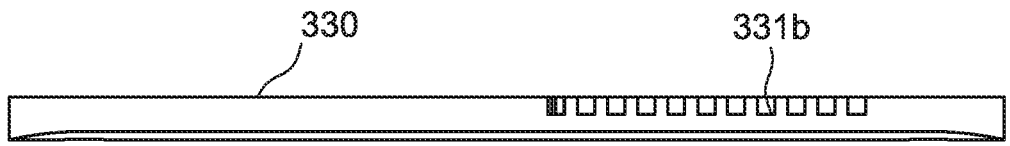
FIG. 5C is a back view of the emitter main body.
Figure 5D:
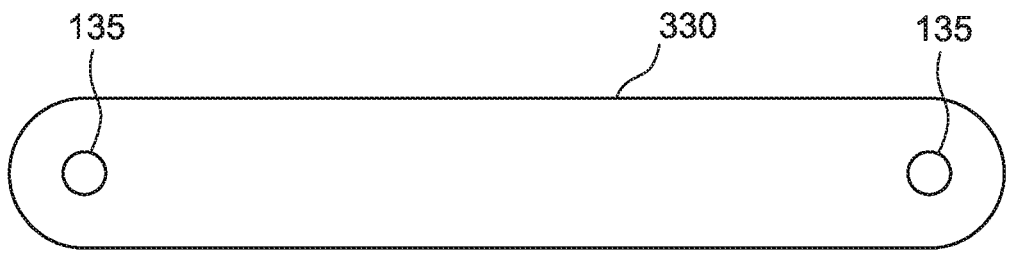
FIG. 5D is a bottom view of the emitter main body.
Figure 5E:
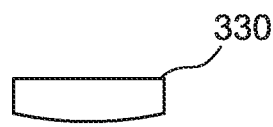
FIG. 5E is a side view of the emitter main body.
Figure 6A:
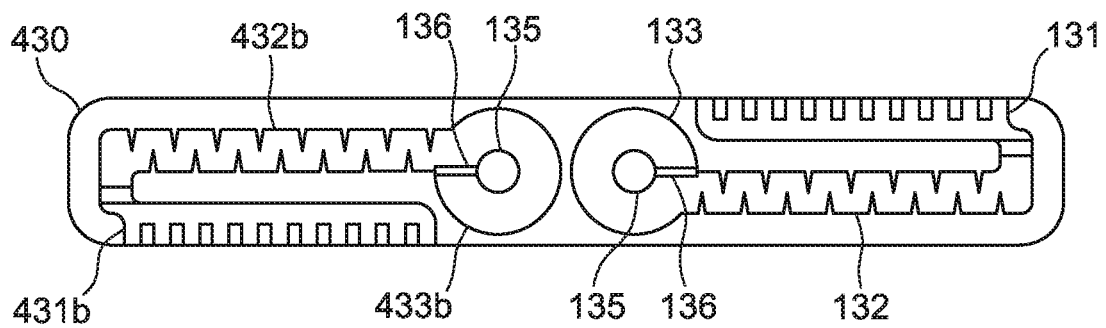
FIG. 6A is a plan view of an emitter main body of a fourth embodiment of the present invention.
Figure 6B:
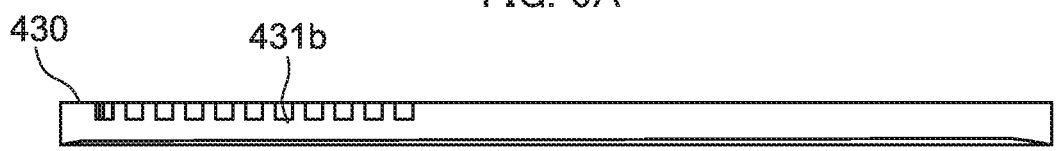
FIG. 6B is a front view of the emitter main body.
Figure 6C:
FIG. 6C is a back view of the emitter main body.
Figure 6D:
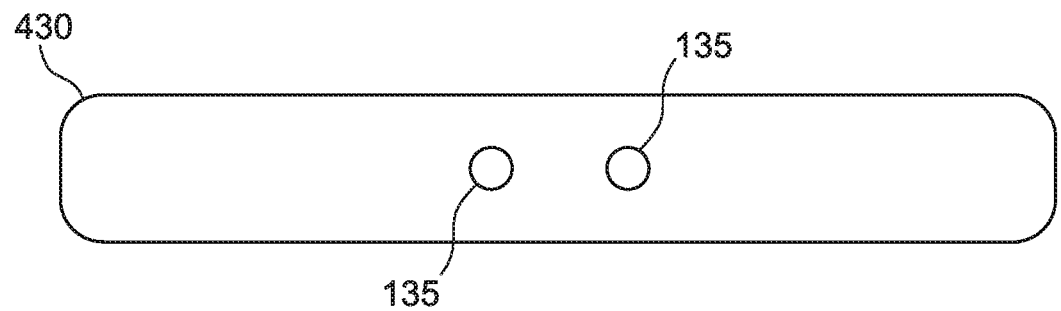
FIG. 6D is a bottom view of the emitter main body.
Figure 6E:
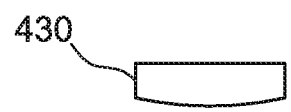
FIG. 6E is a side view of the emitter main body.

FIG. 3A is a plan view of emitter main body 130, FIG. 3B is a front view of emitter main body 130, FIG. 3C is a back view of emitter main body 130, FIG. 3D is a bottom view of emitter main body 130, and FIG. 3E is a side view of emitter main body 130.

Emitter main body 130 is a plate-shaped member having a substantially rectangular plan shape. The top surface of emitter main body 130 is flat, and the bottom surface of emitter main body 130 is a convex surface that protrudes at a center portion in the short direction of emitter main body 130 and is uniformly extends in the longitudinal direction of emitter main body 130. In addition, emitter main body 130 includes a flat side surface at the front surface side and the back surface side thereof. Emitter main body 130 includes first recess 131, pressure reducing groove 132, second recess 133, through hole 135 and communication groove 136. The depths of the groove and the recess formed in the top surface of emitter main body 130 (the distances from the top surface to the bottoms of the groove and the recess) are 0.3 to 0.5 mm, for example.

First recess 131 is a recess formed in the top surface of emitter main body 130 at a side edge portion on the back surface side. First recess 131 is formed such that first recess 131 opens at a side surface along the longitudinal direction of emitter main body 130. With this configuration, first recess 131 opens at the top surface and the side surface (back surface) of emitter main body 130, and has a planar shape including a slender recess extending along the longitudinal direction and a plurality of recesses of a comb-tooth shape extending outward and connected with the slender recess at the side edge portion.

Pressure reducing groove 132 is formed in the top surface of emitter main body 130 so as to extend along the longitudinal direction at a center portion in the short direction of emitter main body 130, and is connected with first recess 131 at one end portion of emitter main body 130. At an end portion of first recess 131 that is connected with pressure reducing groove 132, the bottom surface of first recess 131 is tilted toward the bottom surface of pressure reducing groove 132. Pressure reducing groove 132 has a zigzag plan shape. The zigzag shape is a shape of the channel that is formed with a substantially triangular prisms alternately disposed along the longitudinal direction on both side surfaces of a rectangular channel, for example. In plan view, the triangular prisms are disposed such that the tips of the triangles do not cross the central axis of the rectangular channel.

Second recess 133 is formed in the top surface of emitter main body 130 on the other end side, and is connected with pressure reducing groove 132. Second recess 133 has a circular plan shape.

Through hole 135 opens at the bottom surface of second recess 133 and the lower surface of emitter main body 130. At the bottom surface of second recess 133, through hole 135 opens at a center portion of the plan shape thereof. Through hole 135 is a columnar hole.

Communication groove 136 is formed in the bottom surface of second recess 133, and is formed between the opening of through hole 135 and the periphery of the bottom surface of second recess 133 so as to communicate between the peripheral portion of the bottom surface and through hole 135. Communication groove 136 is configured to allow for distribution of liquid when film 150 is in contact with the opening of through hole 135 at the bottom surface of second recess 133, and communication groove 136 has a width of about 400 μm and a depth of about 100 μm, for example.

When film 150 is joined on the top surface of emitter main body 130, the upward openings of the groove and the recess are closed with film 150. First recess 131 whose upward opening is closed with film 150 serves as an inflow part into which external liquid (of tube 110) flows. With first recess 131 communicating with the outside at multiple spaced locations along the side surface (back surface) of emitter main body 130 in the longitudinal direction of emitter main body 130, the inflow part has a plurality of openings at the side surface of emitter main body 130 (FIG. 3C).

Pressure reducing groove 132 whose upward opening is closed with film 150 serves as a pressure reducing channel part connected with the inflow part and configured to distribute the liquid having flown into the inflow part while reducing the pressure of the liquid. Second recess 133 whose upward opening is closed with film 150 serves as a flow rate control part connected with the pressure reducing channel part together with communication groove 136, and configured to control the flow rate of the liquid whose pressure has been reduced by the pressure reducing channel part. Through hole 135 serves as a housing part connected with the flow rate control part and configured to house the liquid whose flow rate has been controlled by the flow rate control part.

When irrigation liquid is supplied to tube 110, the liquid flows into emitter 120 (the inflow part) from the openings at the side surface of emitter 120. As described above, the inflow part is open at multiple locations of the side surface of emitter 120, and thus suppresses intrusion of floating matters in the liquid into the inflow part.

The liquid having flown into the inflow part reaches the pressure reducing channel part, and flows through the pressure reducing channel part. The pressure of the liquid flowing through the pressure reducing channel part is reduced due to its pressure drop, and the resulting liquid reaches second recess 133. In this manner, the pressure of liquid is reduced when carried through the pressure reducing channel part. Since the pressure reducing channel part has the zigzag planar shape and a turbulent flow is generated between the substantially triangular prisms adjacent to one another on one side surface of the pressure reducing channel part, floating matters in the liquid tend to be retained between the prisms, thus further reducing floating matters in the liquid supplied to the flow rate control part.

The liquid having reached the second recess 133 fills second recess 133 and communication groove 136, and flows into through hole 135. The liquid having flown into through hole 135 is housed in through hole 135, and is discharged out of tube 110 through discharging port 112 of tube 110.

When the liquid pressure inside tube 110 increases, the flow rate of the liquid flowing into the inflow part increases. Meanwhile, the pressure of the liquid is reduced at the pressure reducing channel part as described above. As a result, in accordance with the difference between the liquid pressure in tube 110 and the pressure of the liquid whose pressure has been reduced by the pressure reducing channel part in emitter 120, a portion of film 150 above second recess 133 deflects toward the opening of the through hole 135 at the bottom surface of second recess 133. As a result, at second recess 133, the width of the liquid channel in the thickness direction of emitter main body 130 decreases, and the flow rate of the liquid supplied from second recess 133 to through hole 135 decreases.

When the liquid pressure further increases in tube 110, a portion of film 150 above second recess 133 further deflects, and makes contact with the opening of through hole 135 at the bottom surface of second recess 133. Normally, the liquid pressure in tube 110 is at a value at which film 150 pushed and deflected by the liquid does not make complete intimate contact with the bottom surface of second recess 133, and as such a gap serving as a liquid channel exists between the peripheral portion of second recess 133 and film 150 even when film 150 makes contact with the opening. That is, through hole 135 communicates with the peripheral portion of second recess 133 through communication groove 136 even when film 150 is in contact with the opening. As a result, the flow rate of the liquid supplied from second recess 133 to through hole 135 is limited to the flow rate of the liquid flowing through communication groove 136.

With this configuration, emitter 120 controls the flow rate of liquid such that the discharging amount of the liquid relatively decreases when the liquid pressure in tube 110 increases. Thus, regardless of the liquid pressure in tube 110, emitter 120 can carry liquid at a substantially constant flow rate as desired, and drip irrigation tube 100 can discharge liquid at the desired flow rate from every discharging port 112.

The channels of emitter 120 are defined by the grooves and recesses formed in the top surface of emitter main body 130 and the through hole extending through emitter main body 130. In manufacture of emitter main body 130 by shaping with a resin, the mold for the groove and recess can be collected in one of the upper mold and the lower mold, and thus the shape of the other can be significantly simplified. With this configuration, in comparison with the emitter main body in which the groove and the recess are provided in both the top surface and the lower surface of emitter main body 130, the cost of the metal mold shaping can be reduced and ease of removal of the molded article can be increased, thus further increasing the productivity of emitter 120.

In addition, joining (e.g. by fusing) of emitter main body 130 and film 150 can be readily controlled in comparison with joining of emitter main body 130 and the inner wall surface of tube 110. In view of this, variation in channel height (depth) of emitter 120 due to the joining operation is smaller than that of the height (depth) of the channel formed by the groove and the recess in the lower surface of emitter main body 130 when emitter 120 is joined to tube 110. Thus, the channel of emitter 120 is substantially formed in a desired size, and variation in flow rate among emitters 120 is further suppressed.

Note that emitter main body 130, the grooves, the recesses and/or the through holes may be processed into an undercut shape in the case where they are manufactured by shaping with a resin from the viewpoint of facilitating the removal. In addition, the planar shapes of the grooves and the recesses of emitter main body 130 may be appropriately set as long as a desired function can be ensured.

In addition, first recess 131 may not open at the side surface of emitter main body 130, and, for example, first recess 131 may open only at the top surface of emitter main body 130 in such a manner that only a part of the opening is closed with film 150.

In addition, in the flow rate control part, the bottom surface of second recess 133 may be tilted from the periphery side toward the opening edge of through hole 135. Second recess 133 having a bottom surface of such a shape is preferable from the viewpoint of further precisely controlling the liquid flow rate in the state where film 150 is in contact with the opening of through hole 135 at the bottom surface of second recess 133.

Further, in the flow rate control part, a plurality of communication grooves 136 (radially extending from through hole 135, for example) may be formed in the bottom surface of second recess 133. The plurality of communication grooves 136 are preferable from the viewpoint of increasing the discharging amount of the liquid from discharging port 112 when the liquid pressure inside tube 110 is high.

As is clear from the above description, emitter 120 includes the inflow part configured to allow inflow of external liquid; a pressure reducing channel part connected with the inflow part and configured to distribute the liquid having flown in the inflow part while reducing the pressure of the liquid; a flow rate control part connected with the pressure reducing channel part and configured to control the flow rate of the liquid whose pressure has been reduced by the pressure reducing channel part; and a housing part connected with the flow rate control part and configured to house the liquid whose flow rate has been controlled by the flow rate control part. Emitter 120 is composed of emitter main body 130 and film 150 having flexibility joined to emitter main body 130. Emitter main body 130 includes first recess 131 opening at at least the top surface of emitter main body 130; pressure reducing groove 132 of a zigzag planar shape opening at the top surface of emitter main body 130 and connected with first recess 131; second recess 133 opening at the top surface of emitter main body 130 and connected with pressure reducing groove 132; through hole 135 opening at second recess 133 and the lower surface of emitter main body 130; and communication groove 136 configured to communicate between the peripheral portion of second recess 133 and through hole 135. Further, film 150 is joined on the top surface of emitter main body 130 such that at least a part of first recess 131 opens to the outside. With this configuration, emitter 120 can be manufactured at a lower cost in comparison with an emitter in which the groove and recess are formed on both the top surface and the lower surface of emitter main body 130, and variation in flow rate among emitters 120 can be suppressed.

In addition, the configuration in which emitter main body 130 includes a top surface, a lower surface, and a side surface, and first recess 131 opens at the top surface and the side surface, and, film 150 is joined on the entirety of the top surface is further preferable from the viewpoint of suppressing intrusion of floating matters in liquid of tube 110 into emitter 120 with the inflow part opening at the side surface of emitter 120.

In addition, the configuration in which the lower surface of the emitter main body is curved to protrude downward in the cross-sectional shape of the emitter main body is further preferable from the viewpoint of increasing the joining strength of emitter 120 to the inner wall surface of tube 110.

In addition, drip irrigation tube 100 includes tube 110 including discharging port 112 extending through a pipe wall of the drip irrigation tube, and emitter 120 joined on an inner wall surface of tube 110 at a position corresponding to discharging port 112. With this configuration, drip irrigation tube 100 can be manufactured at a lower cost in comparison with a drip irrigation tube including an emitter in which the groove and recess are formed in both the top surface and the lower surface of emitter main body 130, and, variation in liquid flow rate among emitters 120 (discharging ports 112) can be suppressed.

Note that the emitter of the present embodiment may include a plurality of the first recesses, the pressure reducing grooves, and/or the sets of the second recess, the through hole and the communication groove.

For example, the emitter of the embodiments of the present invention may include a plurality of the first recesses and pressure reducing grooves, and the above-mentioned set. Such an emitter (the emitter of the second embodiment) has a configuration identical to that of emitter 120 except that the emitter main body illustrated in FIGS. 4A to 4E is provided in place of emitter main body 130.

As illustrated in FIGS. 4A to 4E, emitter main body 230 includes first recesses 131 and 231b, pressure reducing grooves 132 and 232b, second recess 233, and a set of through hole 135 and communication groove 136.

The configuration of emitter main body 230 is identical to that of emitter main body 130 except that the length of the plan shape of emitter main body 230 in the longitudinal direction is substantially double that of emitter main body 130. First recess 231b is disposed on the other end side of emitter main body 230 in the longitudinal direction so as to open at the top surface and the front surface of emitter main body 230. Pressure reducing groove 232b is disposed on the other end side of emitter main body 230 in the longitudinal direction so as to open at the top surface of emitter main body 230 and is connected with first recess 231b at the other end portion. Second recess 233 opens at the top surface of emitter main body 230 at a center portion of emitter main body 230, and is connected with pressure reducing grooves 132 and 232b. Note that communication groove 136 extends along the short direction of emitter main body 230 from the opening edge of through hole 135 toward the front surface side of emitter main body 230, for example.

As with emitter 120, the emitter of the second embodiment is configured by joining film 150 onto the entirety of the top surface of emitter main body 230. In addition, as with drip irrigation tube 100, a drip irrigation tube including the emitter of the second embodiment is configured by joining the lower surface of the emitter of the second embodiment onto the inner wall surface of tube 110.

The emitter of the second embodiment operates in the same manner as emitter 120 except that liquid in tube 110 enters the emitter from two inflow parts. The emitter of the second embodiment provides the effect of emitter 120, and is further preferable from the viewpoint of discharging the liquid of a sufficient amount according to the liquid pressure from the liquid discharging port 112 when the liquid pressure in tube 110 is low.

In addition, for example, the emitter of an embodiment of the present invention may include a plurality of first recesses, a plurality of pressure reducing grooves and/or a plurality of the sets. Such an emitter (an emitter of the third embodiment) substantially has a configuration that is obtained by coupling two emitter main bodies 130 with each other such that two flow rate control parts are disposed at respective end portions in the longitudinal direction. As illustrated in FIGS. 5A to 5E, emitter main body 330 includes first recesses 331a and 331b, pressure reducing grooves 332a and 332b, second recesses 333a and 333b, and two sets of through hole 135 and communication groove 136.

First recess 331a opens at the top surface and the back surface on the other end side of emitter main body 330 in the longitudinal direction, and first recess 331b opens at the top surface and the front surface on one end side of emitter main body 330 in the longitudinal direction. In addition, pressure reducing groove 332a is disposed on the other end side of emitter main body 330 in the longitudinal direction so as to open at the top surface of emitter main body 330 and is connected with first recess 331a at a center portion. Pressure reducing groove 332b is disposed on one end side of emitter main body 330 in the longitudinal direction so as to open at the top surface of emitter main body 330, and is connected with first recess 331b at a center portion.

Second recess 333a is disposed in the other end portion of emitter main body 330 in the longitudinal direction so as to open at the top surface of emitter main body 330, and is connected with pressure reducing groove 332a. Second recess 333b is disposed in one end portion of emitter main body 330 in the longitudinal direction so as to open at the top surface of emitter main body 330, and is connected with pressure reducing groove 332b. In addition, in the set of through hole 135 and communication groove 136, the hole and the groove in each of second recesses 333a and 333b are disposed as in second recess 133.

As with emitter 120, the emitter of the third embodiment is configured by joining film 150 onto the entirety of the top surface of emitter main body 330. In addition, as with drip irrigation tube 100, a drip irrigation tube including the emitter of the third embodiment is configured by joining the emitter of the third embodiment on the lower surface of the inner wall surface of tube 110.

The emitter of the third embodiment operates as with emitter 120 except that liquid in tube 110 enters the emitter from the two inflow parts. The emitter of the third embodiment is further preferable from the view point of substantially doubling the flow rate of the liquid discharged from discharging port 112 of tube 110 per emitter, and from the view point of increasing liquid supply range in the cultivation bed such as soil per emitter.

In addition, for example, the emitter of an embodiment of the present invention (an emitter of the fourth embodiment) may substantially have a configuration that is obtained by coupling two emitter main bodies 130 such that two flow rate control parts are disposed at a center portion in the longitudinal direction. As illustrated in FIGS. 6A to 6E, emitter main body 430 includes first recesses 131 and 431b, pressure reducing grooves 132 and 432b, second recesses 133 and 433b, and two sets of through hole 135 and communication groove 136.

First recess 431b is open at the top surface and the front surface on the other end side of emitter main body 430 in the longitudinal direction. Pressure reducing groove 432b is disposed on the other end side of emitter main body 430 in the longitudinal direction so as to open at the top surface of emitter main body 430, and is connected with the other end portion first recess 431b. Second recess 433b and second recess 133 are disposed side by side at a center portion of emitter main body 430 in the longitudinal direction, and second recess 433b opens at the top surface of emitter main body 430. Second recess 433b is connected with pressure reducing groove 432b. The set of through hole 135 and communication groove 136 in second recess 433b are disposed as in second recess 133.

As with emitter 120, the emitter of the fourth embodiment is configured by joining film 150 onto the entirety of the top surface of emitter main body 430. In addition, as with drip irrigation tube 100, a drip irrigation tube including the emitter of the fourth embodiment is configured by joining the lower surface of the emitter of the fourth embodiment onto the inner wall surface of tube 110.

The emitter of the fourth embodiment operates as with emitter 120 except that liquid in tube 110 enters the emitter from the two inflow parts. The emitter of the fourth embodiment provides the effect of emitter 120, and is further preferable from the viewpoint of substantially doubling the flow rate of the liquid discharged from discharging port 112 of tube 110 per emitter.

Figure 7:
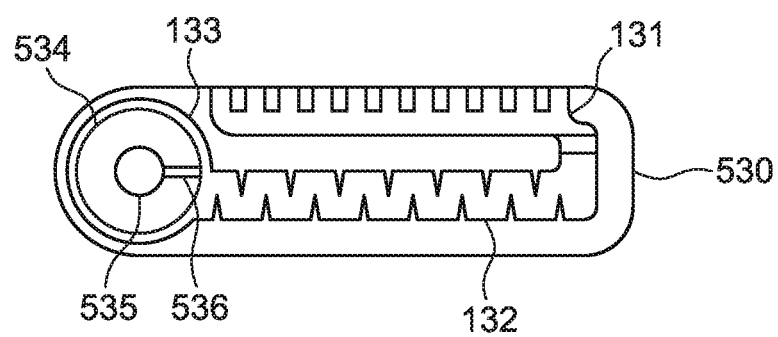
FIG. 7 is a plan view of an emitter main body of a fifth embodiment of the present invention.

In addition, for example, the emitter main body of an embodiment of the present invention may further include a protruding part protruding from the bottom surface of the second recess up to a position lower than the top surface of the emitter main body. In this case, the through hole opens at the top surface of the protruding part and the lower surface of the emitter main body, and the communication groove is formed in the top surface of the protruding part between the upper edge of the protruding part and the opening edge of the through hole. For example, as illustrated in FIG. 7, emitter main body 530 has a configuration identical to that of emitter main body 130 except that protruding part 534 is further provided, and through hole 535 and communication groove 536 are provided in place of through hole 135 and communication groove 136, respectively.

Protruding part 534 protrudes from the bottom surface of second recess 133 up to a position lower than the top surface of emitter main body 130. For example, protruding part 534 is a cylindrical member, and the planar shape of protruding part 534 is a circle smaller than that of second recess 133. The difference between the height of the top surface of protruding part 534 and the height of the top surface of emitter main body 130 is set within a range within which film 150 can make contact with, and can be separated from, the top surface of protruding part 534 under the liquid pressure in tube 110, and is, for example, about 0.3 to 0.5 mm.

Through hole 535 opens at the center of the planar shape of protruding part 534. Communication groove 536 is formed in the top surface of protruding part 534 between the outer peripheral edge of the top surface and the opening edge of through hole 535.

When film 150 deflects under the liquid pressure in tube 110 and comes closer to the top surface of protruding part 534, the width of the liquid channel at second recess 133 in the thickness direction of emitter main body 530 decreases, and the flow rate of the liquid supplied from second recess 133 to through hole 535 decreases. When film 150 deflects under the liquid pressure in tube 110 and makes contact with the top surface of protruding part 534, through hole 535 establishes communication through communication groove 536 and the peripheral portion of second recess 133, which is a space outside protruding part 534 in second recess 133. Thus, the flow rate of the liquid supplied from second recess 133 to through hole 535 is limited to the flow rate of the liquid that flows through communication groove 536.

An emitter including the above-mentioned emitter main body can perform the above-mentioned control of the liquid flow rate by the height of protruding part 534 even when deflection of film 150 is small. The configuration in which the emitter main body includes the protruding part is further preferable from the viewpoint of precisely controlling the liquid flow rate by the contact of the film in the emitter even when the liquid pressure in the tube is low.

This application is entitled to and claims the benefit of Japanese Patent Application No. 2016-227011 filed on Nov. 22, 2016, the disclosure each of which including the specification, drawings and abstract is incorporated herein by reference in its entirety.

INDUSTRIAL APPLICABILITY

According to the present invention, it is possible to provide, with high productivity, an emitter which can drop liquid with an appropriate rate by the pressure of the liquid to be dropped. Accordingly, popularization of the emitter in the technical fields of drip irrigations and endurance tests where long-term dropping is required, and development in the technical fields can be expected.

REFERENCE SIGNS LIST

100 Drip irrigation tube
110 Tube
112 Discharging port
120 Emitter
130, 230, 330, 430, 530 Emitter main body
131, 231b, 331a, 331b, 431b First recess
132, 232b, 332a, 332b, 432b Pressure reducing groove
133, 233, 333a, 333b, 433b Second recess
135, 535 Through hole
136, 536 Communication groove
150 Film
534 Protruding part

What is claimed is:

1. An emitter, comprising:
    an inflow part configured to allow inflow of external liquid;
    a pressure reducing channel part connected with the inflow part and configured to distribute the liquid having flowed into the inflow part while reducing a pressure of the liquid;
    a flow rate control part connected with the pressure reducing channel part and configured to control a flow rate of the liquid whose pressure has been reduced by the pressure reducing channel part; and
    a housing part connected with the flow rate control part and configured to house the liquid whose flow rate has been controlled by the flow rate control part,
    wherein the emitter is configured by an emitter main body and a film joined on the emitter main body, the film having flexibility,
    wherein the emitter main body includes:
        at least one first recess opening at at least a top surface of the emitter main body,
        at least one pressure reducing groove opening at the top surface of the emitter main body and having a zigzag planar shape, the at least one pressure reducing groove being connected with the at least one first recess,
        at least one second recess opening at the top surface of the emitter main body, the at least one second recess being connected with the at least one pressure reducing groove,
        at least one through hole opening at the at least one second recess and a lower surface of the emitter main body, and
        at least one communication groove configured to communicate between the through hole and a peripheral portion of the at least one second recess,
    wherein the film is joined on the top surface of the emitter main body, the at least one first recess is closed with the film and serves as the inflow part, the at least one pressure reducing groove is closed with the film and serves as the pressure reducing channel part, the at least one second recess is closed with the film and serves as the flow rate control part, and the through hole serves as the housing part, and
    wherein at least a part of the at least one first recess opens to outside of the emitter.

2. The emitter according to claim 1,
    wherein the emitter main body includes the top surface, the lower surface, and a side surface;
    wherein the at least one first recess opens at the top surface and the side surface; and
    wherein the film is joined on an entirety of the top surface.

3. The emitter according to claim 1, wherein the lower surface of the emitter main body is curved to protrude downward in a cross-sectional shape of the emitter main body.

4. The emitter according to claim 1, wherein the emitter main body includes a plurality of the first recesses.

5. The emitter according to claim 1, wherein the emitter main body includes a plurality of the pressure reducing grooves.

6. The emitter according to claim 1, wherein the emitter main body includes a plurality of sets of the second recess, the through hole and the communication groove.

7. A drip irrigation tube, comprising:
    a tube including a discharging port extending through a pipe wall of the drip irrigation tube; and
    an emitter joined on an inner wall surface of the tube at a position corresponding to the discharging port,
    wherein the emitter is the emitter according to claim 1.

* * * * *